(12) United States Patent
Croyle

(10) Patent No.: US 6,594,866 B1
(45) Date of Patent: Jul. 22, 2003

(54) WRIST CORSAGE AND HOLDER

(76) Inventor: Leslie K. Croyle, 26726 Midland Rd., Cleveland, OH (US) 44140

( * ) Notice: Subject to any disclaimer, the term of this patent is extended or adjusted under 35 U.S.C. 154(b) by 261 days.

(21) Appl. No.: 09/285,078

(22) Filed: Apr. 2, 1999

(51) Int. Cl.[7] .......................... A44C 5/00; A44B 21/00; A45F 5/08
(52) U.S. Cl. .................... 24/5; 24/3.1; 24/3.7; 24/3.12; 24/339; 63/1 R; 63/3
(58) Field of Search ........................... 24/5, 6, 3.1, 3.7, 24/3.12, 339, 11 R, 11 FE; 63/3, 11, 5 A

(56) References Cited

U.S. PATENT DOCUMENTS

| | | | | |
|---|---|---|---|---|
| 1,163,866 A | * | 12/1915 | Sexton | 24/339 |
| 1,580,772 A | * | 4/1926 | Ashton | 24/339 |
| 1,644,948 A | * | 10/1927 | Poirier | 24/339 |
| 2,242,975 A | * | 5/1941 | Kaber | 24/5 |
| 3,949,568 A | * | 4/1976 | Gallagher | 24/5 |
| 4,502,298 A | * | 3/1985 | Benton | 63/1 R |
| 5,553,326 A | * | 9/1996 | Moore | 2/181.4 |
| 5,703,330 A | * | 12/1997 | Kujawski | 24/339 |
| 5,816,072 A | * | 10/1998 | Michaels | 63/3 |

FOREIGN PATENT DOCUMENTS

GB       0625705    *  7/1949  .................. 24/339

* cited by examiner

Primary Examiner—Victor Sakran
(74) Attorney, Agent, or Firm—Mattingly, Stanger & Malur, P.C.

(57) ABSTRACT

A wrist corsage includes a flower corsage mounted on a wrist corsage holder. The holder includes an open bracelet and clamp design to secure the flower corsage to the bracelet. Preferably, the bracelet has a unitary construction, made of a molded plastic. The flower corsage is pressed into the clamp to attach it thereby, and the bracelet with attached corsage is then worn on the wrist.

8 Claims, 4 Drawing Sheets

WRIST CORSAGE AND HOLDER

BACKGROUND OF THE INVENTION

1. Field of the Invention

The present invention relates generally to wrist-worn ornaments, and, more particularly, to a holder for a wrist corsage and improvements in the attachment of a flower corsage to a wrist corsage holder.

2. Description of the Related Art

FIG. 1 shows an example of a conventional wrist corsage holder, in plan view. The same wrist corsage holder is shown in FIG. 2, viewed from below.

Essentially, two parts constitute the wrist corsage holder. A flat metal clasp 2, typically stamped from a metal plate, has means 4 for mounting a flower corsage (not shown), and means 6 for receiving a band 8, which is used to attach the clasp 2 and mounted flower corsage to the wearer's wrist. Commonly, band 8 is either a closed elastic band as shown, or an open strap having a fastener (such as VELCRO) to fixedly attach the wrist corsage to the wearer's wrist.

The prior art wrist corsage holder has proved suitable in many respects. However, mounting the flower corsage to the holder requires folding the metal ends of the clasp 2 over the corsage, which has proven cumbersome and time-consuming. Further, band 8 may become disattached from clasp 2, requiring the wrist corsage to be disassembled to replace the entire holder (clasp and band). Replacement of the holder is both time-consuming and costly, however, and may not be possible if the disattachment occurs when or where no replacement holder is available.

SUMMARY OF THE INVENTION

The present invention addresses this and other problems with the prior art wrist corsage holder, by providing an open bracelet and clamp design to secure the flower corsage to the bracelet. Preferably, the bracelet has a unitary construction, made of a plastic. The flower corsage is pressed into the clamp to attach it thereby, and the bracelet with attached corsage is then worn on the wrist.

DETAILED DESCRIPTION OF THE PREFERRED EMBODIMENTS

Figure 1:
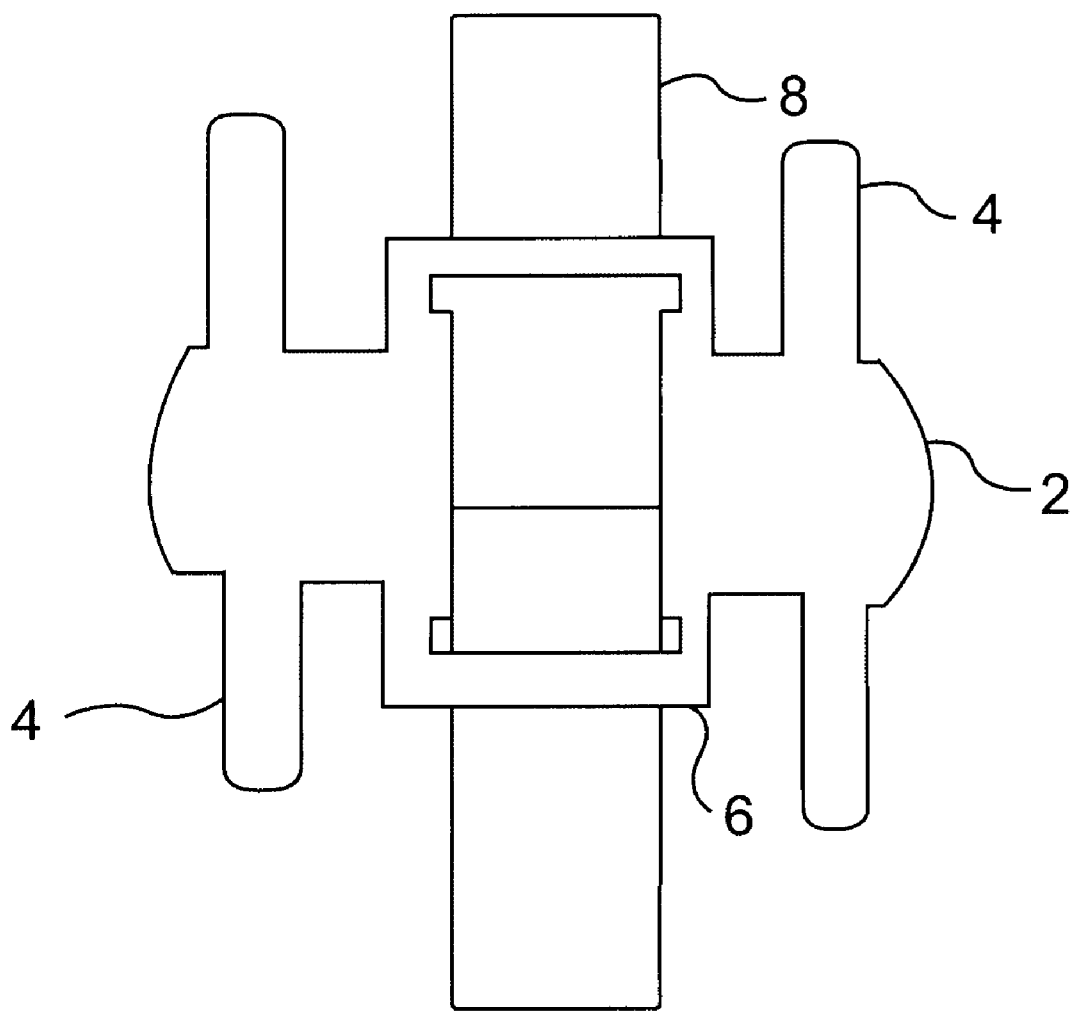
FIG. 1 is a plan view of a prior art wrist corsage holder.
Figure 2:
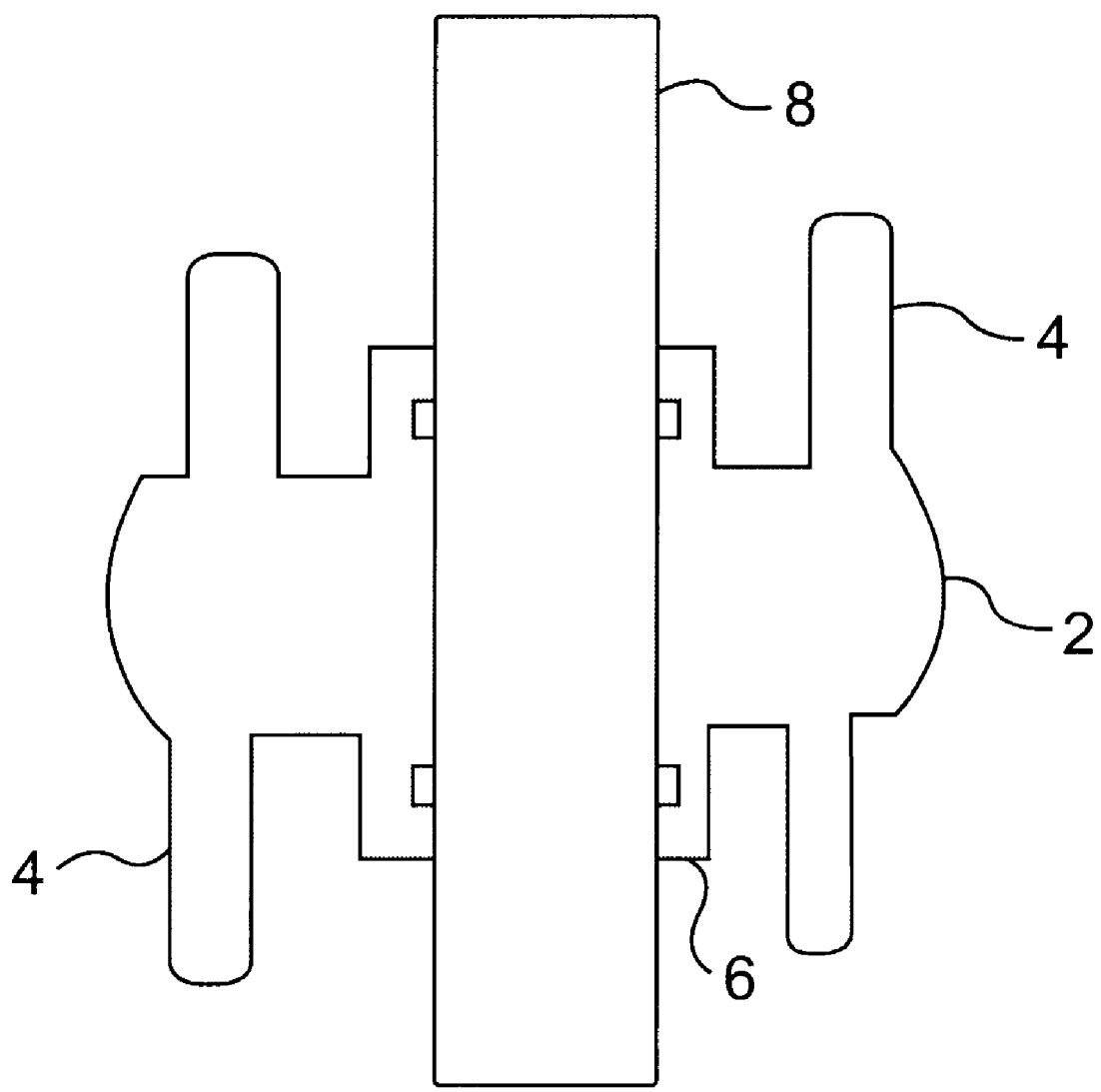
FIG. 2 is a bottom view of the prior art wrist corsage holder shown in FIG. 1.
Figure 3:
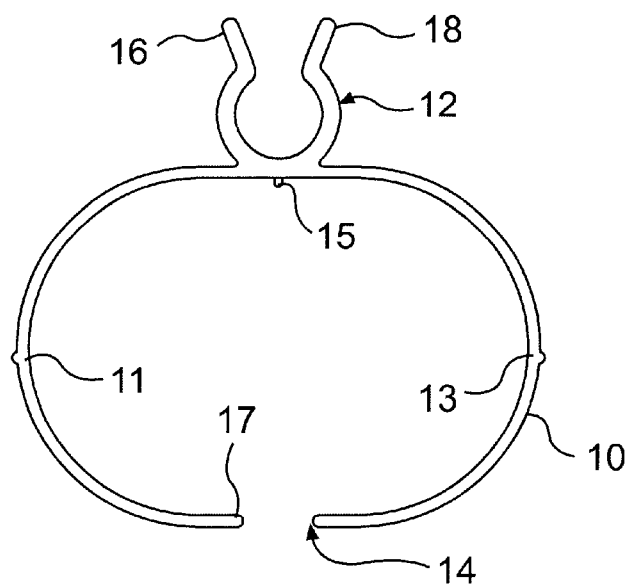
FIG. 3 illustrates a preferred embodiment of a wrist corsage holder constructed according to the teachings of the present invention.

FIG. 3 shows a preferred embodiment of a wrist corsage holder constructed according to the teachings of the present invention. The wrist corsage holder preferably comprises a unitary structure of a plastic known to the art, which is most suitable for ease of manufacture and comfort for the wearer, while adequately supporting a flower corsage. For example, polypropylene is preferred, but other plastics such as styrene and nylon are contemplated, or other appropriate materials may be used. The wrist corsage holder preferably includes an open bracelet 10 and integral clamp 12, into which the flower corsage is fixedly received.

Although the wrist corsage holder is preferably a unitary construction of a plastic, this construction is considered a preferred embodiment inasmuch as it achieves the objectives of the invention in a cost-effective manner. However, the invention contemplates other materials and/or constructions. For example, the wrist corsage holder may be made of other known materials, so long as bracelet 10 can be adequately secured to the wearer's wrist, and so long as clamp 12 retains the characteristic of holding a flower corsage therein. Moreover, clamp 12 may be separate from bracelet 10 during manufacture or in the finished product, although the preferred unitary structure permits the wrist corsage holder to be molded according to known techniques.

By way of example, bracelet 10 may be constructed to be about two inches across at its widest part (i.e., between points 11 and 13), and about one and three-eighths inches between the bottom of clamp 12 and an opening 14 in the bottom of bracelet 10 (i.e., between points 15 and 17). These dimensions, however, may be modified as required; they are believed to be sufficient to permit the bracelet to accommodate most wrists.

Clamp 12 comprises jaws 16, 18, which have a spring resilience suitable for receiving a flower corsage by forcing the jaws apart (i.e., away from each other), whereupon the spring resilience returns the jaws to an unbiased (i.e., more closed) position when not forced apart, thus clamping the flower corsage between the jaws. Therefore, the plastic or other material is preferably selected so that clamp 12 is constructed as shown in FIG. 3.

Suitably, jaws 16, 18 are constructed to have diverging extremities as shown, such that the extremities are spaced approximately one-half inch apart when the jaws are unbiased. Further, clamp 12 is preferably five-eighths inches tall from the top of wrist bracelet 10 to the extremities of jaws 16, 18. These dimensions, however, may be set as required.

Figure 4:
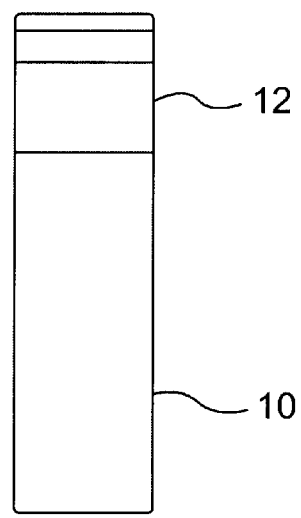
FIG. 4 is a side view of the wrist corsage holder shown in FIG. 3.

FIG. 4 shows a side view of the wrist corsage holder shown in FIG. 3. Both wrist bracelet 10 and clamp 12 are preferably constructed to be five-eighths inch wide in the side view of FIG. 4, and approximately two inches from the bottom of wrist bracelet 10 to the uppermost extremities of jaws 16, 18 of clamp 12. Again, however, these dimensions may be adjusted in manufacture, as required.

Figure 5:
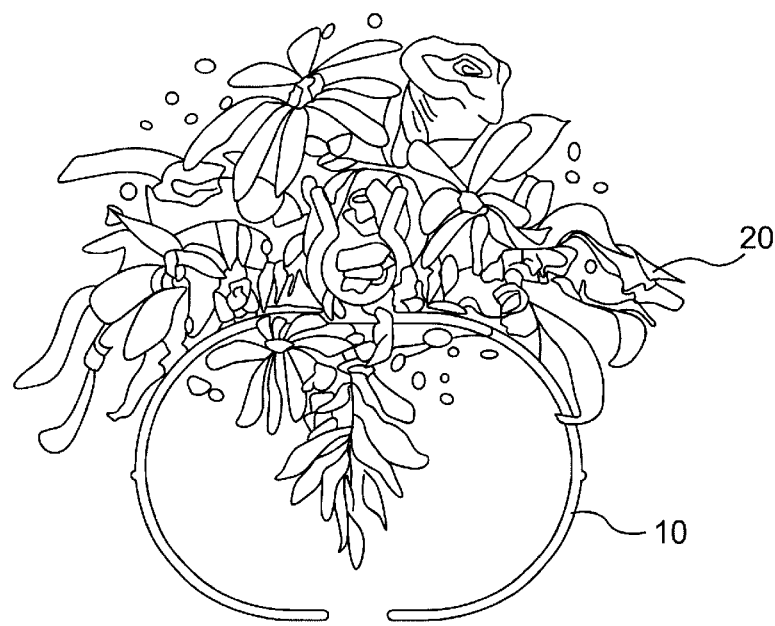
FIG. 5 illustrates a wrist corsage, including the wrist corsage holder of FIG. 3 with a flower corsage attached.
Figure 6:
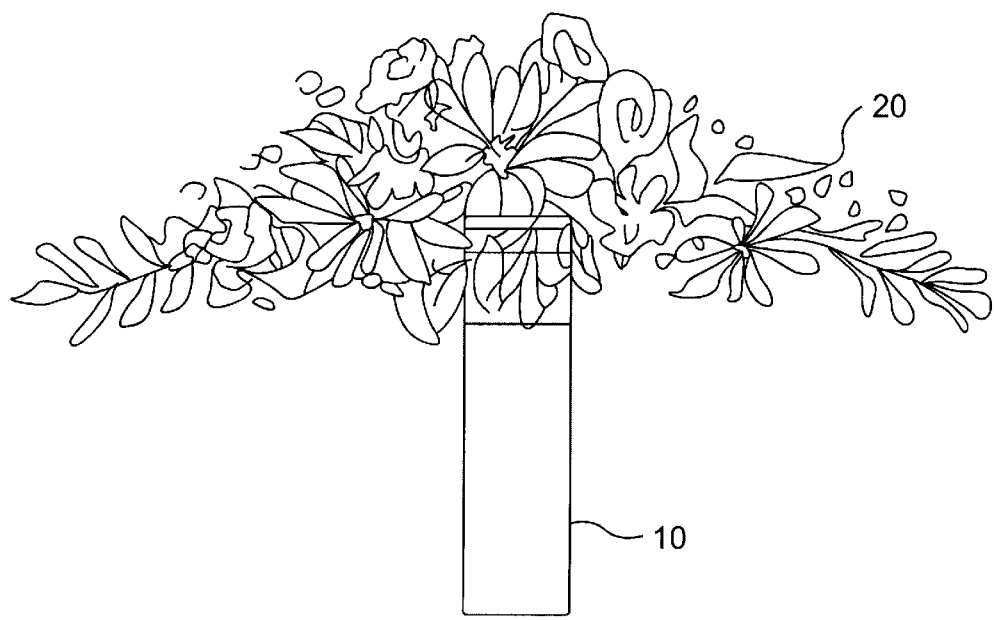
FIG. 6 is a side view of the wrist corsage shown in FIG. 5.

When a flower corsage 20 is inserted into clamp 12 by biasing jaws 16, 18 apart, inserting the flower corsage, and then releasing the jaws, the resilience of the plastic will then return to the unbiased position, thereby holding the flower corsage in place and resulting in the wrist corsage shown in FIG. 5. A side view of the wrist corsage is shown in FIG. 6.

The flower corsage can be of the type typically used with the prior art wrist corsage holder, or of any other suitable type, with no practical limitation so long as it can be clamped within clamp 12.

Various modifications of the invention disclosed above will become apparent to those of ordinary skill in the art. For example, the basic bracelet-clamp structure could be used to mount any ornamentation, whether or not worn on the wrist; the disclosed wrist corsage is simply a preferred embodiment and best mode contemplated for the invention. All such modifications that basically rely upon the teachings through which the present invention has advanced the state of the art are properly considered within the spirit and scope of the invention.

I claim:

1. A body-worn holder for an ornamentation, comprising:
   a generally curved bracelet whose configuration is adapted to attach the bracelet to a human body; and
   a clamp having a pair of jaws arranged to receive an ornament;
   wherein the clamp has a spring resilience that is sufficient to permit securement of an ornament between the jaws of the clamp by pressing the ornament between the jaws of the clamp against the spring resilience, whereby the spring resilience alone secures the ornament between the jaws after said pressing ceases;
   wherein the bracelet and the clamp are integral in a unitary construction, and comprise a plastic.

2. A body-worn holder as claimed in claim 1, wherein the plastic is selected from the group consisting of polypropylene, styrene, and nylon.

3. A wrist corsage, comprising:
   a generally curved band configured to be attached to a human wrist;
   a clamp having a pair of jaws arranged to receive a flower corsage, wherein the clamp has a spring resilience that is sufficient to permit securement of a flower corsage between the jaws of the clamp by pressing the flower corsage between the jaws of the clamp against the spring resilience, whereby the spring resilience alone secures the flower corsage between the jaws after said pressing ceases; and
   a flower corsage secured between the jaws of the clamp.

4. A wrist corsage as claimed in claim 3, wherein the band comprises a plastic.

5. A wrist corsage as claimed in claim 4, wherein the plastic is selected from the group consisting of polypropylene, styrene, and nylon.

6. A wrist corsage as claimed in claim 3, wherein the band and the clamp are integral in a unitary construction, and comprise a plastic.

7. A wrist corsage as claimed in claim 6, wherein the plastic is selected from the group consisting of polypropylene, styrene, and nylon.

8. A method for producing a wrist corsage, comprising the following steps:
   providing a holder including a generally curved band configured to be worn on a human wrist, and a clamp having a pair of jaws arranged to receive a flower corsage, wherein the clamp has a spring resilience that is sufficient to permit securement of a flower corsage between the jaws of the clamp;
   inserting a flower corsage into the clamp by pressing the flower corsage between the laws of the clamp against the spring resilience; and
   ceasing said pressing, thereby securing the flower corsage between the jaws solely by the spring resilience of the jaws.

\* \* \* \* \*